United States Patent
Krivenok et al.

(10) Patent No.: US 12,373,124 B2
(45) Date of Patent: Jul. 29, 2025

(54) SYSTEM AND METHOD FOR HYBRID CAPACITY EXPANSION OF VIRTUAL STORAGE APPLIANCES DEPLOYED ON CLOUD STORAGE DEVICES

(71) Applicant: Dell Products L.P., Round Rock, TX (US)

(72) Inventors: Dmitry Krivenok, Dublin (IE); Amitai Alkalay, Kadima (IL)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/490,884

(22) Filed: Oct. 20, 2023

(65) Prior Publication Data

US 2025/0130730 A1    Apr. 24, 2025

(51) Int. Cl.
G06F 3/06    (2006.01)

(52) U.S. Cl.
CPC .......... *G06F 3/0634* (2013.01); *G06F 3/0613* (2013.01); *G06F 3/0631* (2013.01); *G06F 3/067* (2013.01); *G06F 3/0607* (2013.01)

(58) Field of Classification Search
CPC .... G06F 3/0607; G06F 3/0613; G06F 3/0631; G06F 3/0634; G06F 3/067
USPC ....................................................... 711/154
See application file for complete search history.

(56) References Cited

U.S. PATENT DOCUMENTS

| | | | |
|---|---|---|---|
| 9,971,548 B1* | 5/2018 | Talwar | G06F 3/0613 |
| 10,193,821 B1* | 1/2019 | Greenwood | H04L 43/0876 |
| 10,254,970 B1* | 4/2019 | Martin | G06F 3/061 |
| 11,379,254 B1* | 7/2022 | Karumbunathan | G06F 3/064 |
| 2013/0179648 A1* | 7/2013 | Yagame | G06F 3/0665 |
| | | | 711/E12.001 |
| 2016/0291885 A1* | 10/2016 | Pendharkar | G06F 12/0804 |
| 2016/0350021 A1* | 12/2016 | Matsushita | G06F 12/04 |
| 2019/0095109 A1* | 3/2019 | Zhou | G06F 3/0688 |
| 2021/0405903 A1* | 12/2021 | Srinivasan | G06F 3/0653 |
| 2022/0413723 A1* | 12/2022 | Thakkar | G06F 3/061 |
| 2023/0024060 A1* | 1/2023 | Bhattacharjee | G06F 3/064 |
| 2023/0080046 A1* | 3/2023 | Paul | G06F 3/067 |
| | | | 707/822 |

* cited by examiner

*Primary Examiner* — Reginald G Bragdon
*Assistant Examiner* — Aaron D Ho
(74) *Attorney, Agent, or Firm* — Brian J. Colandreo; Heath M. Sargeant; Holland & Knight LLP

(57) ABSTRACT

A method, computer program product, and computing system for identifying a change in a capacity of a cloud-deployed storage system. A capacity ratio and a IOPS ratio are determined for the cloud-deployed storage system. A portion of a cloud-deployed storage device is modified based upon, at least in part, one or more of the capacity ratio and the IOPS ratio. The portion of the cloud-deployed storage device is mapped to a portion of a logical storage device.

14 Claims, 6 Drawing Sheets

SYSTEM AND METHOD FOR HYBRID CAPACITY EXPANSION OF VIRTUAL STORAGE APPLIANCES DEPLOYED ON CLOUD STORAGE DEVICES

BACKGROUND

Existing software-defined virtual storage appliances running in public clouds have legacy physical storage appliances and capacity expansion schemes based on adding drives (cloud volumes or virtual disks) or virtual expansion shelves. Even though this approach requires minimal changes in the storage software stack, it has multiple issues in the public cloud environments such as: a high infrastructure cost of the initial system configuration; a high infrastructure cost of the capacity increment due to very large increments (entire volume size); a limited number of cloud volume attachment slots in the cloud instances limits the ability to scale to large capacity without significant initial cost; and a need for data rebalancing in the background consumes cloud instance and cloud volume IOPS and throughput, and either impacts the performance of production workloads or significantly defers recognition of the new capacity.

SUMMARY OF DISCLOSURE

In one example implementation, a computer-implemented method executed on a computing device may include, but is not limited to, identifying a change in a capacity of a cloud-deployed storage system. A capacity ratio and a IOPS ratio are determined for the cloud-deployed storage system. A portion of a cloud-deployed storage device is modified based upon, at least in part, one or more of the capacity ratio and the IOPS ratio. The portion of the cloud-deployed storage device is mapped to a portion of a logical storage device.

One or more of the following example features may be included. The cloud-deployed storage system may include a cloud-deployed virtual storage appliance (VSA). Identifying the change in the capacity of the cloud-deployed storage system may include identifying a request to increase the capacity of the cloud-deployed storage system. Modifying the portion of the cloud-deployed storage device may include determining that the capacity ratio is less than the IOPS ratio. A number of cloud-deployed storage devices to provision at maximum capacity may be determined, thus defining a number of maximum capacity cloud-deployed storage devices. A maximum IOPS metric for each maximum capacity cloud-deployed storage device may be determined based upon, at least in part, a maximum cloud-deployed storage device capacity. A number of cloud-deployed storage devices to provision at a lower capacity may be determined, thus defining a number of lower capacity cloud-deployed storage devices. An IOPS metric of each lower capacity cloud-deployed storage device may be determined based upon, at least in part, a lower cloud-deployed storage device capacity. Modifying the portion of the cloud-deployed storage device may include determining that the capacity ratio is greater than or equal to the IOPS ratio. A number of cloud-deployed storage devices to provision at a maximum IOPS metric may be determined, thus defining a number of maximum IOPS cloud-deployed storage devices. A maximum storage capacity for each maximum IOPS cloud-deployed storage device may be determined based upon, at least in part, the maximum IOPS metric. A number of cloud-deployed storage devices to provision at a lower IOPS metric may be determined, thus defining a number of lower IOPS cloud-deployed storage devices. A storage capacity for each lower IOPS cloud-deployed storage device may be determined based upon, at least in part, the maximum IOPS metric.

In another example implementation, a computer program product resides on a computer readable medium that has a plurality of instructions stored on it. When executed by a processor, the instructions cause the processor to perform operations that may include, but are not limited to, identifying a change in a capacity of a cloud-deployed storage system. A capacity ratio and a IOPS ratio are determined for the cloud-deployed storage system. A portion of a cloud-deployed storage device is modified based upon, at least in part, one or more of the capacity ratio and the IOPS ratio. The portion of the cloud-deployed storage device is mapped to a portion of a logical storage device.

One or more of the following example features may be included. The cloud-deployed storage system may include a cloud-deployed virtual storage appliance (VSA). Identifying the change in the capacity of the cloud-deployed storage system may include identifying a request to increase the capacity of the cloud-deployed storage system. Modifying the portion of the cloud-deployed storage device may include determining that the capacity ratio is less than the IOPS ratio. A number of cloud-deployed storage devices to provision at maximum capacity may be determined, thus defining a number of maximum capacity cloud-deployed storage devices. A maximum IOPS metric for each maximum capacity cloud-deployed storage device may be determined based upon, at least in part, a maximum cloud-deployed storage device capacity. A number of cloud-deployed storage devices to provision at a lower capacity may be determined, thus defining a number of lower capacity cloud-deployed storage devices. An IOPS metric of each lower capacity cloud-deployed storage device may be determined based upon, at least in part, a lower cloud-deployed storage device capacity. Modifying the portion of the cloud-deployed storage device may include determining that the capacity ratio is greater than or equal to the IOPS ratio. A number of cloud-deployed storage devices to provision at a maximum IOPS metric may be determined, thus defining a number of maximum IOPS cloud-deployed storage devices. A maximum storage capacity for each maximum IOPS cloud-deployed storage device may be determined based upon, at least in part, the maximum IOPS metric. A number of cloud-deployed storage devices to provision at a lower IOPS metric may be determined, thus defining a number of lower IOPS cloud-deployed storage devices. A storage capacity for each lower IOPS cloud-deployed storage device may be determined based upon, at least in part, the maximum IOPS metric.

In another example implementation, a computing system includes at least one processor and at least one memory architecture coupled with the at least one processor, wherein the at least one processor configured to identify a change in a capacity of a cloud-deployed storage system. A capacity ratio and a IOPS ratio are determined for the cloud-deployed storage system. A portion of a cloud-deployed storage device is modified based upon, at least in part, one or more of the capacity ratio and the IOPS ratio. The portion of the cloud-deployed storage device is mapped to a portion of a cloud-deployed storage device.

One or more of the following example features may be included. The cloud-deployed storage system may include a cloud-deployed virtual storage appliance (VSA). Identifying the change in the capacity of the cloud-deployed storage system may include identifying a request to increase the capacity of the cloud-deployed storage system. Modifying the portion of the cloud-deployed storage device may include determining that the capacity ratio is less than the IOPS ratio. A number of cloud-deployed storage devices to provision at maximum capacity may be determined, thus defining a number of maximum capacity cloud-deployed storage devices. A maximum IOPS metric for each maximum capacity cloud-deployed storage device may be determined based upon, at least in part, a maximum cloud-deployed storage device capacity. A number of cloud-deployed storage devices to provision at a lower capacity may be determined, thus defining a number of lower capacity cloud-deployed storage devices. An IOPS metric of each lower capacity cloud-deployed storage device may be determined based upon, at least in part, a lower cloud-deployed storage device capacity. Modifying the portion of the cloud-deployed storage device may include determining that the capacity ratio is greater than or equal to the IOPS ratio. A number of cloud-deployed storage devices to provision at a maximum IOPS metric may be determined, thus defining a number of maximum IOPS cloud-deployed storage devices. A maximum storage capacity for each maximum IOPS cloud-deployed storage device may be determined based upon, at least in part, the maximum IOPS metric. A number of cloud-deployed storage devices to provision at a lower IOPS metric may be determined, thus defining a number of lower IOPS cloud-deployed storage devices. A storage capacity for each lower IOPS cloud-deployed storage device may be determined based upon, at least in part, the maximum IOPS metric.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
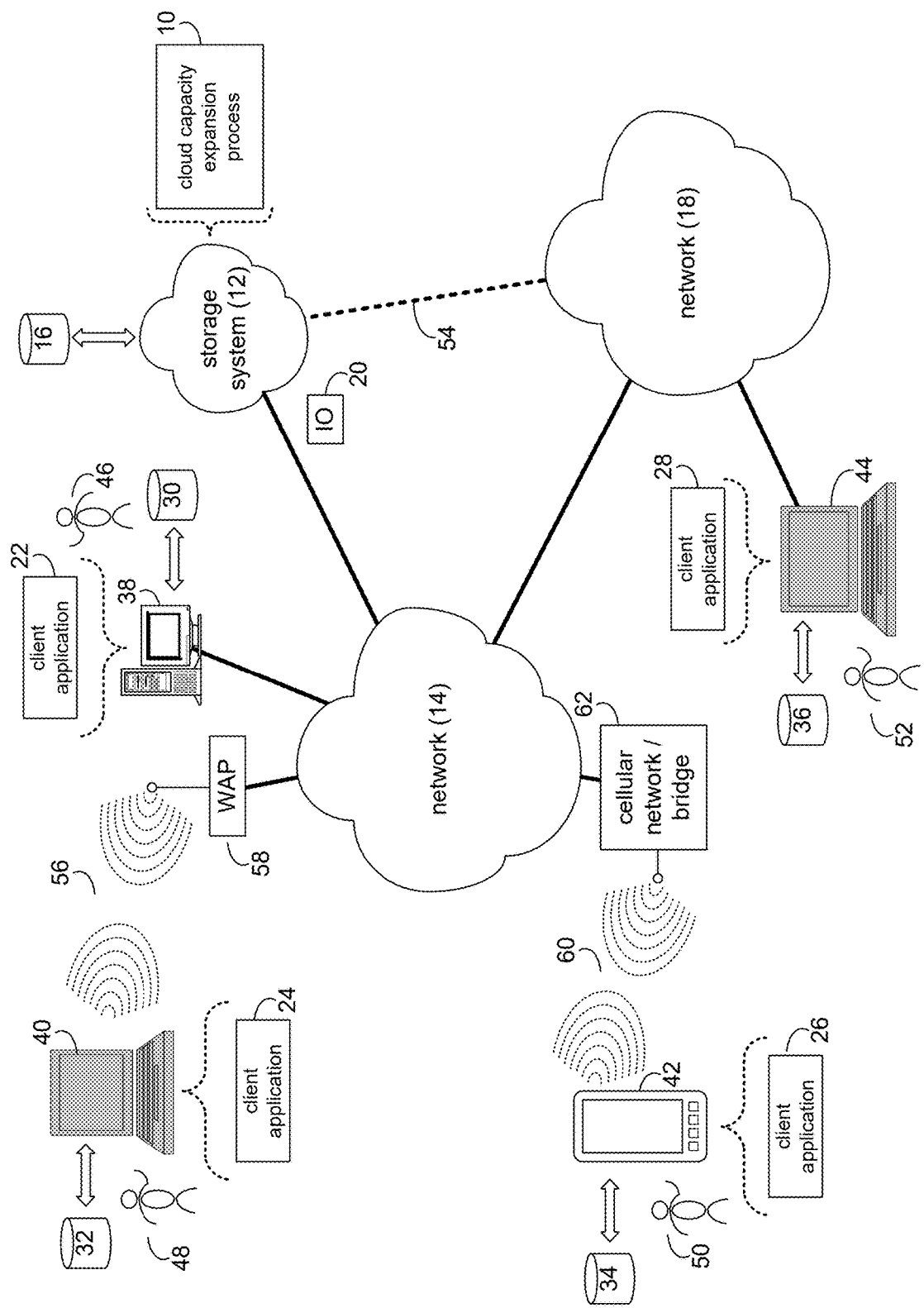
FIG. 1 is an example diagrammatic view of a storage system and a cloud capacity expansion process coupled to a distributed computing network according to one or more example implementations of the disclosure.

Referring to FIG. 1, there is shown cloud capacity expansion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cloud capacity expansion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of cloud capacity expansion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be described below in greater detail, a cloud capacity expansion process, such as cloud capacity expansion process 10 of FIG. 1, may include but is not limited to, identifying a change in a capacity of a cloud-deployed storage system. A capacity ratio and a IOPS ratio are determined for the cloud-deployed storage system. A portion of a cloud-deployed storage device is modified based upon, at least in part, one or more of the capacity ratio and the IOPS ratio. The portion of the cloud-deployed storage device is mapped to a portion of a logical storage device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
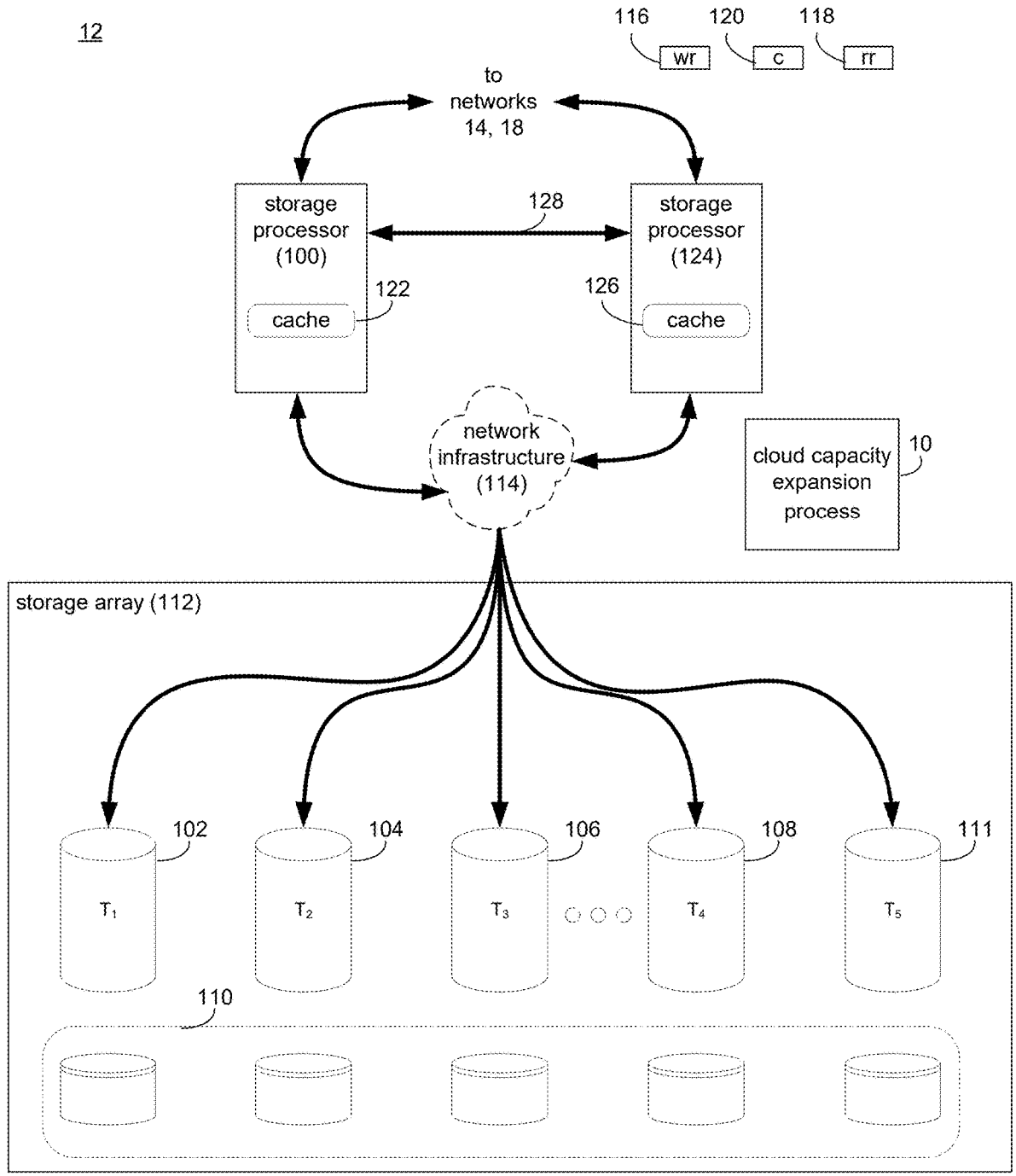
FIG. 2 is an example diagrammatic view of the storage system of FIG. 1 according to one or more example implementations of the disclosure.
Figure 3:
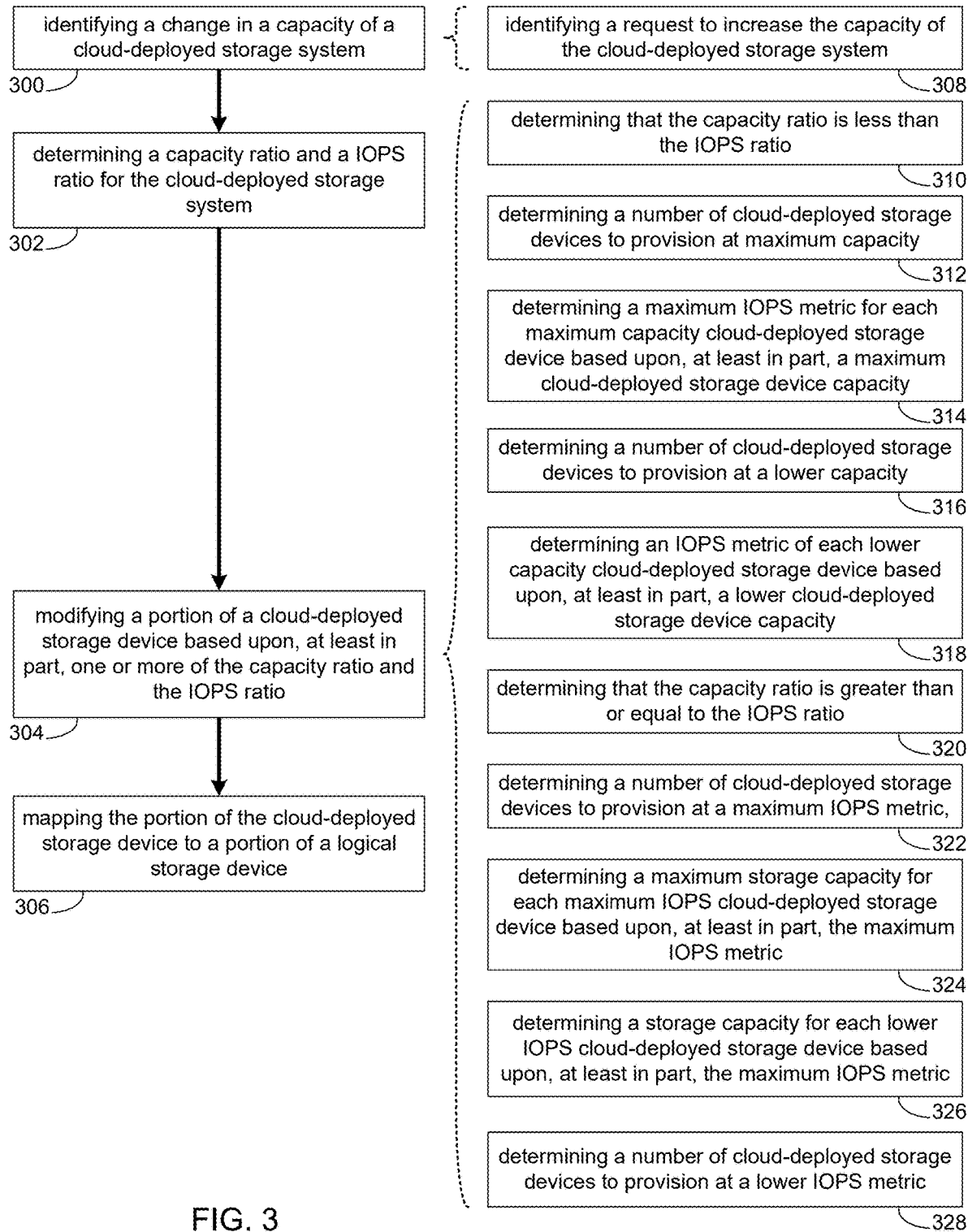
FIG. 3 is an example flowchart of cloud capacity expansion process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability.

Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are described above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g., the level of redundancy/performance/capacity required.

Storage targets 102, 104, 106, 108 and coded target 111 may be created as volumes using one or more electromechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cloud capacity expansion process 10. The instruction sets and subroutines of cloud capacity expansion process 10, which may be stored on a storage device (e.g., storage device 16)

coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As described above, some portions of the instruction sets and subroutines of cloud capacity expansion process 10 may be stored on storage devices (and/or executed by processors and memory architectures) that are external to storage system 12.

As described above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As described above, the instruction sets and subroutines of cloud capacity expansion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cloud capacity expansion process 10 may be executed by one or more processors (not shown) and one or more memory architectures (not shown) included within data array 112.

Further and as described above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from being overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of cloud capacity expansion process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of cloud capacity expansion process 10 may be executed by one or more processors (not shown) and one or more memory architectures (not shown) included within data array 112.

Further and as described above, during the operation of data array 112, content (e.g., content 118) to be written to data array 112 may be received from storage processor 124 and initially stored within backend cache memory system 124 prior to being stored on e.g., one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As described above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Cloud Capacity Expansion Process:

Referring also to the examples of FIGS. 3-6 and in some implementations, cloud capacity expansion process 10 may identify 300 a change in a capacity of a cloud-deployed storage system. A capacity ratio and a IOPS ratio are determined 302 for the cloud-deployed storage system. A portion of a cloud-deployed storage device is modified 304 based upon, at least in part, one or more of the capacity ratio and the IOPS ratio. The portion of the cloud-deployed storage device is mapped 306 to a portion of a logical storage device.

As will be described in greater detail below, implementations of the present disclosure may provide optimized expansion of storage capacity of cloud-deployed storage systems where the cloud-deployed storage devices include tiered pricing models. For example, existing software-defined virtual storage appliances running in the public clouds have legacy physical storage appliances and capacity expansion schemes based on adding drives (cloud volumes or virtual disks) or virtual expansion shelves. Even though this approach requires minimal changes in the storage software stack, it has multiple issues in the public cloud environments such as: a high infrastructure cost of the initial system configuration; a high infrastructure cost of the capacity increment due to very large increments (entire volume size); a limited number of cloud volume attachment slots in the cloud instances limits the ability to scale to large capacity without significant initial cost; and a need for data rebalancing in the background consumes cloud instance and cloud volume IOPS and throughput, and either impacts the performance of production workloads or significantly defers recognition of the new capacity. As will be described in greater detail below, implementations of the present disclosure enable lower total cost of ownership (TCO) of a cloud-deployed virtual storage appliance by using a hybrid expansion model combining volume/storage device additions and volume/storage device increases.

In some implementations and as described above, portions of a storage system (e.g., storage system 12) may be deployed in a cloud-deployed storage system. A cloud-deployed storage system is a technological environment that provides cloud-based computing services over a set of hosted servers and applications, which are accessible over the internet or other network configuration. Examples of cloud-based computing services include applications and development platforms, to servers, storage, and virtual computing systems. Cloud-based computing services are provided by cloud computing providers (cloud providers) as a service over the internet. Their services include servers, virtual machines, applications, application development platforms, storage, databases, and/or networking. Users (individuals or entities) can subscribe to cloud computing services with varying pricing options to choose from. Examples of cloud providers include, but are not limited to, Microsoft® Azure® from Microsoft Corporation in the United States, Amazon Web Services™ (AWS™) from Amazon.com, Inc., and Google Cloud Platform™ from Google LLC.

Figure 4:
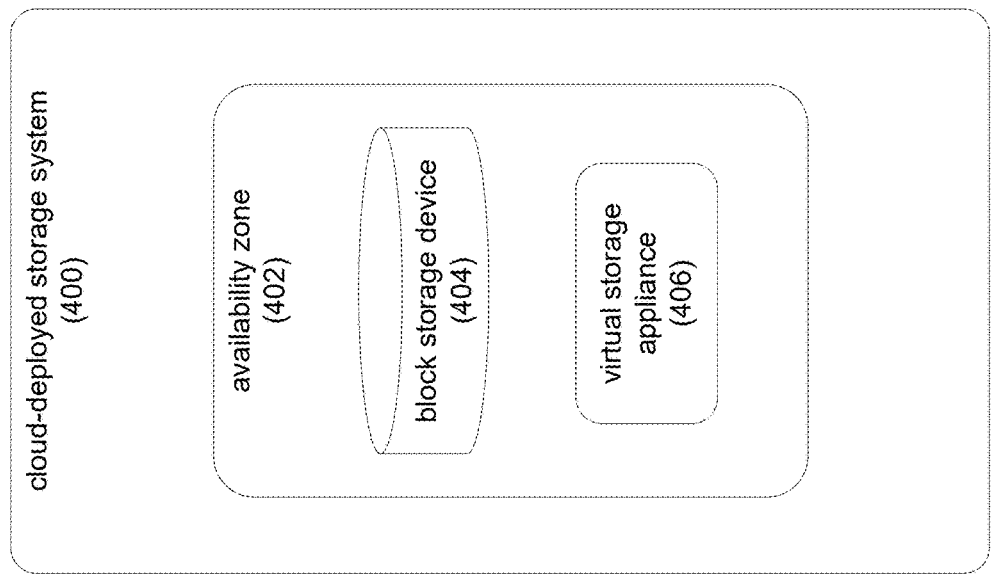
FIG. 4 is an example diagrammatic view of a cloud-deployed storage system according to one or more example implementations of the disclosure.

Referring also to FIG. 4 and in some implementations, a cloud-deployed storage system (e.g., cloud-deployed storage system 400) may be configured to perform various cloud-based computing services. In some implementations, the cloud-deployed storage system may include availability zones (e.g., availability zone 402). An availability zone is an isolated data center or storage system located within specific regions in which public cloud services originate and operate. Cloud service providers typically have multiple worldwide availability zones. This helps ensure cloud customers have a stable connection to a cloud service in the geographic zone that is closest to them and/or that meets their specific needs. Users typically use availability zones for a variety of reasons, including compliance and proximity to customers. Cloud administrators can also choose to replicate services across multiple availability zones to decrease latency or protect resources. Administrators can move resources to another availability zone in the event of an outage. Specific cloud services may also be limited to particular regions or availability zones.

In some implementations, each availability zone (e.g., availability zone 402) may have access to or include various resources. For example, each availability zone (e.g., availability zone 402) may provide access to various storage resources (e.g., block storage device 404; and virtual storage appliance (VSA) 406). In some implementations, a block storage device (e.g., block storage device 404) is a storage device deployed within the cloud-deployed storage system that is configured to store data in equally sized blocks. This system offers performance advantages over traditional storage, and generally boasts lower latency. However, a block storage device is a premier storage device and is typically the most expensive. In one example, the cloud-based block storage device is Amazon Elastic Block Storage.

Cloud-deployed storage systems use virtualization technology, which allows for the creation of simulated virtual computers that behave like physical computers. Such computers are called Virtual Machines (VM). Though multiple VMs can be created on one physical server, VMs typically work as isolated independent machines and their files and other resources are not visible to one other. Virtualization allows more efficient use of hardware resources by running multiple VMs in the same hardware and serving multiple users or user applications at the same time, which helps to reduce the cost of computing.

In some implementations, a virtual storage appliance (VSA) may be deployed in the cloud-deployed storage system. A VSA is a set of virtual machines in the cloud-deployed storage system with storage devices that typically store an operating system, applications, and data. In the example of FIG. 4, a VSA (e.g., VSA 406) may be deployed within availability zone 402. In one example, VSA 406 is a PowerStore™ virtual storage appliance available from Dell Technologies Inc. However, it will be appreciated that various VSAs may be used within the scope of the present disclosure.

In some implementations, cloud capacity expansion process 10 provides capacity expansion for software defined VSA (virtual storage appliance) in cloud-deployed storage systems built on top of cloud volumes with a tiered pricing model. Cloud capacity expansion process 10 takes into account non-trivial limitations and constraints of modern clouds such as AWS®, reduces the cloud storage infrastructure costs (and hence TCO) via multiple techniques, eliminates the need of background rebalancing operations impacting performance of production workloads, and minimizes the scope of changes required in the VSA software stack. Specifically, cloud capacity expansion process 10 provides a combination of adding and resizing of elastic cloud volumes in a way fully transparent to the VSA data path stack.

For example, consider an exemplary tiered cost model as a function of input/output per second (IOPS) as shown below in Table 1:

TABLE 1

| Provisioned IOPS per volume | $/thousand IOPS/month | Cloud volume type |
|---|---|---|
| 0-32k | $65 | io2, io2-BlockExpress |
| 32k-64k | $46 | io2, io2-BlockExpress |
| 64k-256k | $32 | io2-BlockExpress |

As shown above, this exemplary tiered cost model demonstrates the difference in cost for different performance and capacity points considering cloud-specific limitations such as max IOPS per volume and max volume capacity. To address these limitations, cloud capacity expansion process 10 may generally provision as few storage devices as possible to meet performance and capacity requirements because there are no per-storage device free IOPS like for other cloud storage device types. Cloud capacity expansion process 10 may also seek to maximize the number of storage devices with maximally provisioned IOPS to appreciate the benefits of the tiered cost model. Additionally, cloud capacity expansion process 10 may seek to distribute IOPS across storage devices proportional to their size/capacity.

However, these goals may require significant changes in the core capacity expansion flow and the data path of the virtual storage appliance. To address these constraints and as will be described in greater detail below, cloud capacity expansion process 10 introduces logical storage devices/logical volumes deployed between the VSA data path and the cloud-deployed storage devices/cloud-deployed volumes.

Figure 5:
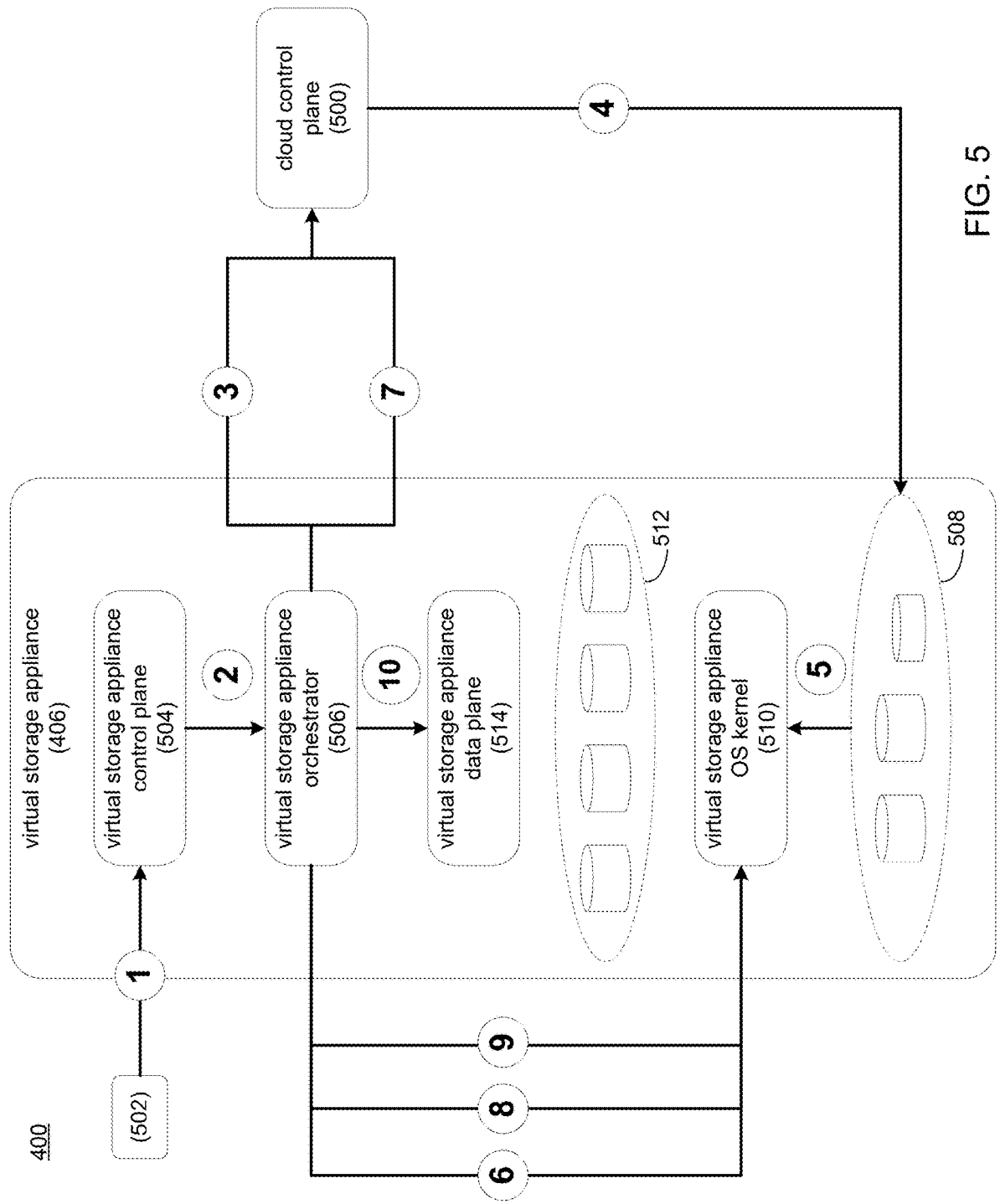
FIG. 5 is an example diagrammatic view of the cloud capacity expansion process according to various example implementations of the disclosure.

In some implementations, cloud capacity expansion process 10 identifies 300 a change in a capacity of a cloud-deployed storage system. Referring also to FIG. 5 and in some implementations, cloud capacity expansion process 10 identifies 300 a change in a capacity for a cloud-deployed storage system (e.g., cloud-deployed storage system 12). As shown in FIG. 5, cloud-deployed storage system 12 includes a virtual storage appliance (VSA) (e.g., VSA 406) and a cloud control plane (e.g., cloud control plane 500). Cloud control plane 500 may generally include a cloud storage service that manages backend cloud-deployed storage devices. For example, cloud control plane 500 may modify existing cloud-deployed storage devices and/or may add new cloud-deployed storage devices to cloud-deployed storage system 12. As will be described in greater detail below, cloud capacity expansion process 10 may manage cloud-deployed storage devices while providing logical storage device intermediaries within the VSA data path and mapping the logical storage devices to the corresponding cloud-deployed storage devices. In some implementation, cloud capacity expansion process 10 identifies 300 a change in the capacity of cloud-deployed storage system 400. In one example, the change may be a scheduled event as part of automated management of cloud-deployed storage system 400. In this example, suppose that the availability of cloud-deployed storage devices changes over time. Accordingly, cloud capacity expansion process 10 may identify 300 a scheduled change in the capacity of cloud-deployed storage system 12.

In some implementations, identifying 300 the change in the capacity of the cloud-deployed storage system includes identifying 308 a request to increase the capacity of the cloud-deployed storage system. For example, suppose a user provides a request (e.g., request 502) to update the capacity of cloud-deployed storage system 12. In this example, request 502 may include a new desired capacity for cloud-deployed storage system 12. For instance, request 502 may specify a new total capacity for cloud-deployed storage system 12 (e.g., 20 terabytes of total capacity). In another example, request 502 may define an amount of storage capacity to add to cloud-deployed storage system 12 (e.g., add 10 terabytes of storage capacity). Accordingly, it will be appreciated that cloud capacity expansion process 10 may identify 300 a change in the capacity of cloud-deployed storage system from internal and external requests within the scope of the present disclosure.

In some implementations, cloud capacity expansion process 10 determines 302 a capacity ratio and an IOPS ratio for the cloud-deployed storage system. For example, cloud capacity expansion process 10 determines a capacity ratio (i.e., the maximum storage device size divided by the total capacity for the cloud-deployed storage system) and an IOPS ratio (i.e., the maximum storage device IOPS metric divided by the total IOPS metric for the cloud-deployed storage system). Examples of the capacity ratio and the IOPS ratio are shown below as Equations 1 and 2, respectively:

$$CapacityRatio = \frac{MaxStorageDeviceSize}{TotalCapacity} \quad (1)$$

$$IOPSRatio = \frac{MaxStorageDeviceIOPS}{TotalIOPS} \quad (2)$$

where MaxStorageDeviceSize is a predefined value indicative of the maximum size or capacity for cloud-deployed storage devices, TotalCapacity is the updated capacity value determined by cloud capacity expansion process 10, MaxStorageDeviceIOPS is a predefined value indicative of the maximum IOPS metric for the cloud-deployed storage devices, and TotalIOPS is the total IOPS metric for the cloud-deployed storage system.

In some implementations, the capacity ratio and the IOPS ratio define an initial topology for the cloud-deployed storage system. As will be described in greater detail below, cloud capacity expansion process 10 generates two distinct specifications for the cloud-deployed storage device topology-one for storage devices provisioned to either maximum capacity or maximum performance (e.g., IOPS), and another for storage devices with less than the maximum capacity or maximum performance. However, the capacity-to-performance ratio is the same for both groups of storage device specifications.

In some implementations, cloud capacity expansion process 10 modifies 304 a portion of a cloud-deployed storage device based upon, at least in part, one or more of the capacity ratio and the IOPS ratio. For example, cloud capacity expansion process 10 may provide capacity expansion in terms of portions or slices of a cloud-deployed storage device or volume. As will be described in greater detail below, the number of portions may be defined in multiples of "N" portions or slices where "N" is the number of logical storage devices exposed to a virtual storage appliance. In response to changing the total capacity of the cloud-deployed storage system, cloud capacity expansion process 10 determines 302 the capacity ratio and the IOPS ratio for the cloud-deployed storage system. These values may indicate the initial topology of the cloud-deployed storage systems from which cloud capacity expansion process 10 modifies 304 the size and/or number of storage devices to achieve the desired change in capacity.

In some implementations, modifying 304 the portion of the cloud-deployed storage device includes determining 310 that the capacity ratio is less than the IOPS ratio. For example, suppose cloud capacity expansion process 10 determines 310 that the capacity ratio is less than the IOPS ratio. In this example, cloud capacity expansion process 10 may generally provision "M" cloud-deployed storage devices in total where, at most, one storage device may have a storage capacity less than a maximum available storage capacity. In this manner, the performance of the cloud-deployed storage system is defined proportionally to the capacity.

In some implementations, cloud capacity expansion process 10 determines 312 a number of cloud-deployed storage devices to provision at maximum capacity, thus defining a number of maximum capacity cloud-deployed storage devices. For example, cloud capacity expansion process 10 may determine 312 a number of storage devices to provision at maximum capacity as shown below in Equation 3:

$$MaxCount = RoundDown(TotalCapacity/MaxStorageDeviceSize) \quad (3)$$

In some implementations, cloud capacity expansion process 10 determines 314 a maximum IOPS metric for each maximum capacity cloud-deployed storage device based upon, at least in part, a maximum cloud-deployed storage device capacity. For example, cloud capacity expansion process 10 may determine 314 a maximum IOPS metric (i.e., the maximum IOPS metric for a given cloud-deployed storage device) as a function of the maximum cloud-deployed storage device capacity (i.e., MaxStorageDeviceSize from Equation 1) and the total performance of the cloud-deployed storage system (i.e., TotalIOPS from Equation 2) as shown below in Equation 4:

$$MaxIOPS = TotalIOPS * MaxStorageDeviceSize/TotalCapacity \quad (4)$$

In some implementations, cloud capacity expansion process 10 determines 316 a number of cloud-deployed storage devices to provision at a lower capacity, thus defining a number of lower capacity cloud-deployed storage devices. For example, cloud capacity expansion process 10 may determine 316 a number of storage devices to provision at a lower capacity (i.e., less than maximum) as shown below in Equation 5:

$$LowCount = \quad (5)$$
$$RoundUp(TotalCapacity/MaxStorageDeviceSize) - MaxCount$$

In some implementations, cloud capacity expansion process 10 determines a capacity for each lower capacity cloud-deployed storage device as a function of the total capacity of the cloud-deployed storage system, the number of maximum capacity cloud-deployed storage devices, and the maximum storage device size as shown below in Equation 6:

$$LowSize = TotalCapacity - MaxCount/MaxStorageDeviceSize \quad (6)$$

In some implementations, cloud capacity expansion process 10 determines 318 an IOPS metric of each lower capacity cloud-deployed storage device based upon, at least in part, a lower cloud-deployed storage device capacity. For example, cloud capacity expansion process 10 may determine 318 an IOPS metric (i.e., the IOPS metric for a given cloud-deployed storage device not provisioned to maximum capacity) as a function of the capacity for each lower capacity cloud-deployed storage device as shown below in Equation 7:

$$LowIOPS = TotalIOPS * LowSize/TotalCapacity \quad (7)$$

In some implementations, modifying 304 the portion of the cloud-deployed storage device includes determining 320 that the capacity ratio is greater than or equal to the IOPS ratio. For example, suppose cloud capacity expansion process 10 determines 320 that the capacity ratio is greater than or equal to the IOPS ratio. In this example, cloud capacity expansion process 10 may generally provision "M" cloud-deployed storage devices in total where, at most, one storage device may have an IOPS metric less than a maximum IOPS metric. In this manner, the capacity of the cloud-deployed storage system is defined proportionally to the performance.

In some implementations, cloud capacity expansion process 10 determines 322 a number of cloud-deployed storage devices to provision at a maximum IOPS metric, thus defining a number of maximum IOPS cloud-deployed storage devices. For example, cloud capacity expansion process 10 may determine 322 a number of storage devices to provision at maximum performance (e.g., in terms of IOPS metric) as shown below in Equation 8:

$$MaxCount = RoundDown(TotalIOPS/MaxStorageDeviceIOPS) \quad (8)$$

In some implementations, cloud capacity expansion process 10 determines 324 a maximum storage capacity for each maximum IOPS cloud-deployed storage device based upon, at least in part, the maximum IOPS metric. For example, cloud capacity expansion process 10 may determine 324 a maximum storage capacity as a function of the maximum cloud-deployed storage device IOPS metric (i.e., MaxStorageDeviceIOPS from Equation 2), the total capacity of the cloud-deployed storage system (i.e., TotalCapacity from Equation 1), and the maximum as shown below in Equation 9:

$$MaxIOPSStorageDeviceSize = \quad (9)$$
$$TotalCapacity * MaxStorageDeviceIOPS/TotalIOPS$$

In some implementations, cloud capacity expansion process 10 determining a number of cloud-deployed storage devices to provision at a lower IOPS metric, thus defining a number of lower IOPS cloud-deployed storage devices. For example, cloud capacity expansion process 10 may determine a number of storage devices to provision at a lower IOPS metric (i.e., less than maximum) as shown below in Equation 10:

$$LowCount = \qquad (10)$$
$$RoundUp(TotalIOPS/MaxStorageDeviceIOPS) - MaxCount$$

In some implementations, cloud capacity expansion process 10 determines 326 a storage capacity for each lower IOPS cloud-deployed storage device based upon, at least in part, the maximum IOPS metric. For example, cloud capacity expansion process 10 may determine 326 a storage capacity for each lower IOPS cloud-deployed storage device as a function of the total performance of the cloud-deployed storage system, the number of maximum IOPS cloud-deployed storage devices, and the maximum cloud-deployed storage device IOPS metric as shown below in Equation 11:

$$LowSize = TotalCapacity * \qquad (11)$$
$$((TotalIOPS - MaxCount * MaxStorageDeviceIOPS)/TotalIOPS)$$

Referring to Table 2 below, an example of various changes in the capacity of a cloud-deployed storage system are shown with capacity ratios and IOPS ratios for each cloud-deployed storage system.

As shown in Table 2, cloud capacity expansion process 10 is able to modify 304 the cloud-deployed storage devices in a manner that optimizes the expansion of the total capacity by using the capacity ratio and the IOPS ratio to determine the number of storage devices to provision to maximum capacity or to maximum IOPS.

In some implementations, cloud capacity expansion process 10 maps 306 the portion of the cloud-deployed storage device to a portion of a logical storage device. For example, to avoid rebalancing of the data by the VSA data path, cloud capacity expansion process 10 exposes the capacity of underlying cloud storage devices as a homogeneous set of logical block devices. This may be used for both initial presentation as well as after cloud storage devices have been expanded or added to. Cloud capacity expansion process 10 provides the ability to consume different numbers of slices from different physical volumes, including physical volumes added later.

Figure 6:
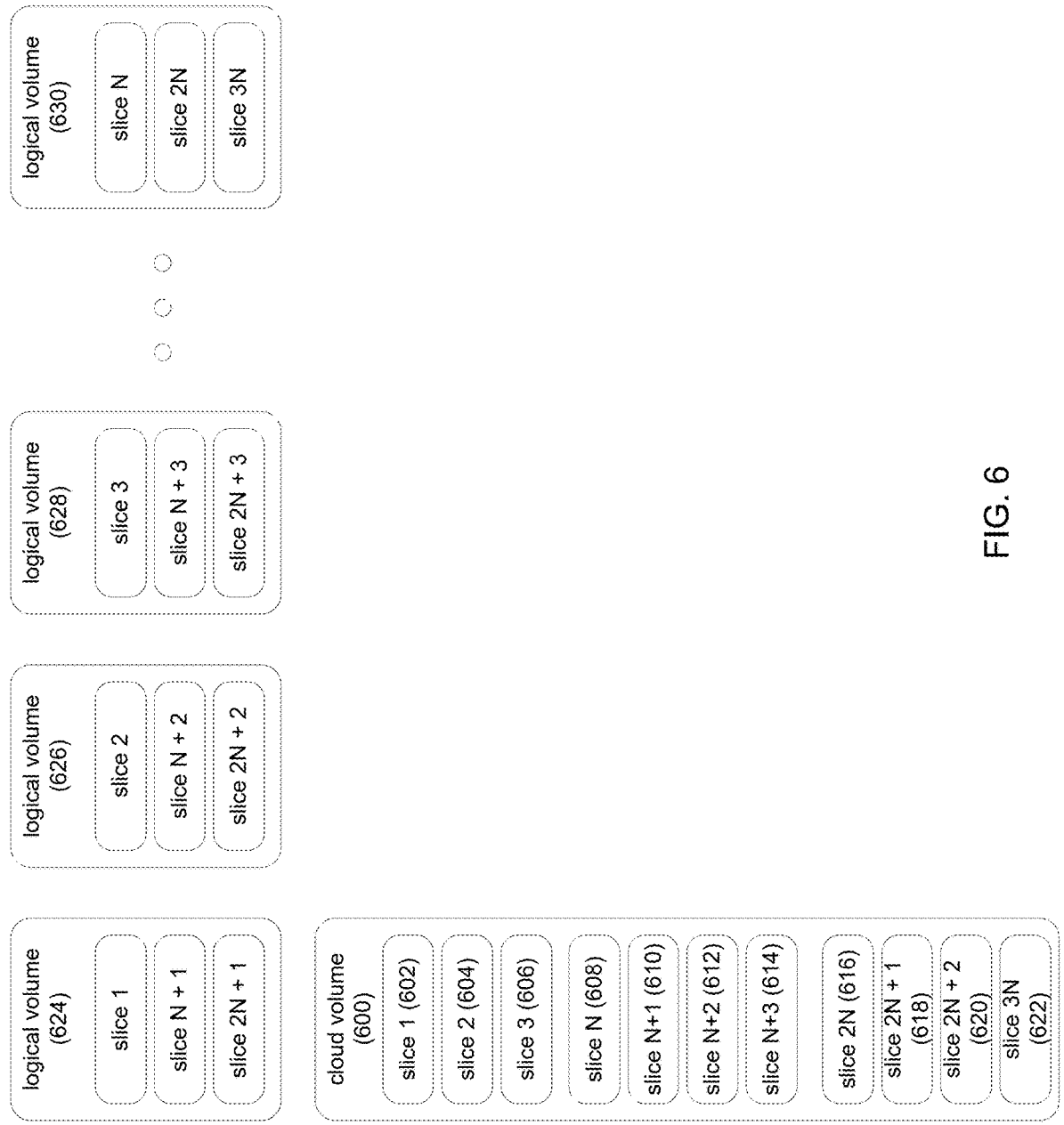
FIG. 6 is an example diagrammatic view of the mapping of cloud-deployed storage device slices to logical storage device slices according to various example implementations of the disclosure.

Referring also to FIG. 6, cloud-deployed storage device 600 may include a plurality of slices (e.g., slice 1 602, slice 2 604, slice 3 606, slice N 608, slice N+1 610, slice N+2 612, slice N+3 614, slice 2N 616, slice 2N+1 618, slice 2N+2 620, and slice 3N 622). Each slice may represent a predefined amount of storage capacity. In some implementations, each cloud-deployed storage device, $V_i$, will have $N*K_i$ slices available for logical storage devices $L_1$ through $L_N$ to consume. For example, cloud capacity expansion process 10 may include a plurality of logical storage devices (e.g., logical storage devices 624, 626, 628, 630). In some implementations, each logical storage device (e.g., logical

TABLE 2

| Type | Total Capacity | Total IOPS | Capacity Ratio | IOPS Ratio | Capacity or IOPS? | Max spec. | Lower spec. | TB/KIOP |
|---|---|---|---|---|---|---|---|---|
| io2 | 17 TB –> | 100K | 0.94 | 0.64 | IOPS | 1 × 10.88 TB @ | 1 × 6.12 TB @ | 0.17 |
|  | 26 TB | 100K | 0.61 | 0.64 | Capacity | 64K | 36K | 0.26 |
|  |  |  |  |  |  | ($55.5/1K) | ($62.9/1K) |  |
|  |  |  |  |  |  | 1 × 16 TB @ | 1 × 10 TB @ |  |
|  |  |  |  |  |  | 61.5K | 38.4K |  |
|  |  |  |  |  |  | ($55.8/1K) | ($61.81/1K) |  |
| io2 | 35 TB –> | 100K | 0.45 | 0.64 | IOPS | 2 × 16 TB @ | 1 × 3 TB @ | 0.35 |
|  | 100 TB | 100K | 0.16 | 0.64 | Capacity | 45.71K | 8.57K | 1.00 |
|  |  |  |  |  |  | ($59.3/1K) | ($65/1K) |  |
|  |  |  |  |  |  | 6 × 16 TB @ | 1 × 4 TB @ |  |
|  |  |  |  |  |  | 16K | 4K |  |
|  |  |  |  |  |  | ($65/1K) | ($65/1K) |  |
| io2 | 3 TB –> | 20K | 5.33 | 3.2 | IOPS | N/A | 1 × 3 TB @ | 0.15 |
|  | 11 TB | 20K | 1.45 | 3.2 | Capacity | N/A | 20K | 0.55 |
|  |  |  |  |  |  |  | ($65/1K) |  |
|  |  |  |  |  |  |  | 1 × 11 TB @ |  |
|  |  |  |  |  |  |  | 20K |  |
|  |  |  |  |  |  |  | ($65/1K) |  |
| io2-BE | 35 TB –> | 100K | 1.82 | 2.56 | Capacity | N/A | 1 × 35 TB @ | 0.35 |
|  | 200 TB | 100K | 0.32 | 2.56 | Capacity | 3 × 64 TB @ | 100K | 2.00 |
|  |  |  |  |  |  | 32K | ($47.04/1K) |  |
|  |  |  |  |  |  | ($65/1K) | 1 × 8 TB @ |  |
|  |  |  |  |  |  |  | 4K |  |
|  |  |  |  |  |  |  | ($65/1K) |  |
| io2-BE | 90 TB –> | 400K | 0.71 | 0.64 | IOPS | 1 × 57.6 TB @ | 1 × 32.4 TB @ | 0.22 |
|  | 150 TB | 400K | 0.41 | 0.64 | Capacity | 256K | 144K | 0.375 |
|  |  |  |  |  |  | ($37.88/1K) | ($42.44/1K) |  |
|  |  |  |  |  |  | 2 × 64 TB @ | 1 × 22 TB @ |  |
|  |  |  |  |  |  | 170.6K | 58.6K |  |
|  |  |  |  |  |  | ($40.81/1K) | ($56.36/1K) |  | storage devices 624, 626, 628, 630) may include a plurality of slices that map to slices of cloud storage device 600. In this example, slice 1 632 of logical storage device 624 may map to slice 1 602 of cloud storage device 600. In some implementations, $K_i$ is determined by the size of the storage device. For each logical storage device $L_j$, cloud capacity expansion process 10 may maintain an ordered mapping between slice range and underlying cloud-deployed storage device $V_i$, starting slice and the number of slices.

In some implementations, cloud capacity expansion process 10 may map 306 portions or slices of cloud-deployed storage device 600 to portions or slices of logical storage devices 624, 626, 628, 630 using a segment tree, interval tree, or an ordered array. Each cloud volume $V_i$ may have $N*K_i$ slices to distribute either initially or because of capacity expansion of those cloud volumes. Accordingly, cloud capacity expansion process 10 may map 306 portions or slices of cloud-deployed storage device 600 to portions or slices of logical storage devices 624, 626, 628, 630 by:

iterating over all cloud storage devices $V_i$ with unconsumed $N*K_i$ slices
        iterating over all logical storage devices $L_j$
            mapping $V_i$ address space into $L_j$ via mapping above In some implementations, each logical storage device may have the same mapping for any $V_i$ as a result of the above-described process (so they all may point to the same data structure to save memory). Assuming $K_i$ is large enough, this approach allows cloud capacity expansion process 10 to minimize the number of mappings to maintain in memory, but even for the worst case of $K_i==1$, the mapping table may not require a lot of memory given the current cloud storage device limits and slices bigger than 1 gigabyte (GB). Even though each logical storage device has the same mapping, they all have different index j=[0 . . . N), so they perform IO requests to different sets of $K_i$ slices defined by the following equation:

$$j + N*t, \text{ where } t = [0 \ldots K_i) \tag{12}$$

This approach works the same way for initial mapping of the slices into logical storage devices and for capacity expansion. Note that in case of capacity expansion, some existing cloud storage volumes, $V_i$, may be expanded by new value of $N*K_i$ and new cloud storage devices may be added. Cloud capacity expansion process 10 may process all available cloud storage devices which have unconsumed slices. When a cloud-deployed storage device reaches its maximum size and all slices are consumed by the logical storage device, the cloud-deployed storage device may be naturally excluded from consideration.

Referring again to FIG. 5 and in some implementations, cloud capacity expansion process 10 is described with several actions. For example, cloud capacity expansion process 10 identifies 300 a change in the capacity of a cloud-deployed storage system (e.g., cloud-deployed storage system 12). This change may be identified in the form of a request (e.g., request 502) at VSA control plane 504. This is represented in FIG. 5 as the action labeled as "1". VSA control plane 504 may validate and derive a new storage device topology by determining 302 a capacity ratio and a IOPS ratio for cloud-deployed storage system 12. VSA control plane 504 may provide the determined capacity ratio and IOPS ratio to the VSA orchestrator (e.g., VSA orchestrator 506). This is represented in FIG. 5 as the action labeled as "2". VSA orchestrator 506 may communicate with cloud control plane 500 by calling a storage device modification application programming interface (API) for existing cloud-deployed storage devices and for creating new cloud-deployed storage devices. This is represented in FIG. 5 as the action labeled as "3".

Continuing with the above example, cloud capacity expansion process 10 may modify 304 a portion of a cloud-deployed storage device based upon, at least in part, one or more of the capacity ratio and the IOPS ratio using cloud control plane 500. For example, cloud control plane 500 may provide an asynchronous communication to VSA 406 to modify 304 the existing cloud-deployed storage devices (e.g., cloud-deployed storage devices 508) or add new cloud-deployed storage devices. This is represented in FIG. 5 as the action labeled as "4".

In response to modifying 304 the portion of a cloud-deployed storage device based upon, at least in part, one or more of the capacity ratio and the IOPS ratio, cloud capacity expansion process 10 may provide the storage device size changes and information concerning any new storage devices to VSA OS kernel 510. This is represented in FIG. 5 as the action labeled as "5". VSA orchestrator 506 may detect a new cloud-deployed storage device topology (e.g., action "6" in FIG. 5) and may check cloud-deployed storage device status (e.g., action "7" in FIG. 5).

In some implementations, cloud capacity expansion process 10 may map 306 the portion of the cloud-deployed storage device to a portion of a logical storage device by mapping 306 new portions/slices of expanded or newly added cloud-deployed storage devices (e.g., cloud-deployed storage devices 508) to portions/slices of logical storage devices (e.g., logical storage devices 512). This is represented in FIG. 5 as the action labeled as "8". Cloud capacity expansion process 10 may, using VSA orchestrator 506, detect a new or modified capacity for logical storage devices 512 (e.g., action "9" in FIG. 5) and may communicate the new logical storage device capacity for logical storage devices 512 to VSA data plane 514 (e.g., action "10" in FIG. 5). In a dual-node VSA based on shared multi-attach cloud-deployed storage devices, VSA orchestrator 506 may ensure that the capacity of both nodes is expanded for all logical storage devices using exactly the same approach (i.e., based on capacity ratio or IOPS ratio) before communicating the new capacity to VSA data plane 514.

In some implementations, cloud capacity expansion process 10 may provide the most cost-effective storage device topology for any capacity point and may provide the same view of underlying storage devices and the same capacity expansion interface for the VSA data path regardless of the type of underlying cloud storage devices, thus minimizing software changes and yielding the most cost-effective storage device topology in all cases. Cloud capacity expansion process 10 may introduce only minor performance overhead via lightweight and thin logical devices layer leveraging trivial LBA remapping and may eliminate the need to perform storage rebalancing (thus consuming IOPS budget) when adding new cloud storage devices due to the way slices of newly added storage devices are mapped into the address space of logical storage devices.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   identifying a change in a capacity of a cloud-deployed storage system;
   determining a first capacity ratio and a first IOPS ratio for the cloud-deployed storage system;
   modifying a portion of a cloud-deployed storage device based upon, at least in part, one or more of the first capacity ratio and the first IOPS ratio, wherein modifying the portion of the cloud-deployed storage device includes determining that the first capacity ratio is less than the first IOPS ratio;
   mapping the portion of the cloud-deployed storage device to a portion of a logical storage device;
   determining a number of cloud-deployed storage devices to provision at maximum capacity, thus defining a number of maximum capacity cloud-deployed storage devices;
   determining a maximum IOPS metric for each maximum capacity cloud-deployed storage device based upon, at least in part, a maximum cloud-deployed storage device capacity;
   determining a number of cloud-deployed storage devices to provision at a lower capacity, thus defining a number of lower capacity cloud-deployed storage devices; and
   determining an IOPS metric of each lower capacity cloud-deployed storage device based upon, at least in part, a lower cloud-deployed storage device capacity.

2. The computer-implemented method of claim 1, wherein the cloud-deployed storage system includes a cloud-deployed virtual storage appliance (VSA).

3. The computer-implemented method of claim 1, wherein identifying the change in the capacity of the cloud-deployed storage system includes identifying a request to increase the capacity of the cloud-deployed storage system.

4. The computer-implemented method of claim 1, wherein modifying the portion of the cloud-deployed storage device includes:
   determining a second capacity ratio and a second IOPS ratio for the cloud-deployed storage system; and
   determining that the second capacity ratio is greater than or equal to the second IOPS ratio.

5. The computer-implemented method of claim 4, further comprising:
   determining a number of cloud-deployed storage devices to provision at a maximum IOPS metric, thus defining a number of maximum IOPS cloud-deployed storage devices;
   determining a maximum storage capacity for each maximum IOPS cloud-deployed storage device based upon, at least in part, the maximum IOPS metric;
   determining a number of cloud-deployed storage devices to provision at a lower IOPS metric, thus defining a number of lower IOPS cloud-deployed storage devices; and
   determining a storage capacity for each lower IOPS cloud-deployed storage device based upon, at least in part, the maximum IOPS metric.

6. A computer program product residing on a non-transitory computer readable medium having a plurality of instructions stored thereon which, when executed by a processor, cause the processor to perform operations comprising:
   identifying a change in a capacity of a cloud-deployed storage system;
   determining a first capacity ratio and a first IOPS ratio for the cloud-deployed storage system;
   modifying a portion of a cloud-deployed storage device based upon, at least in part, one or more of the first capacity ratio and the first IOPS ratio, wherein modifying the portion of the cloud-deployed storage device includes determining that the first capacity ratio is less than the first IOPS ratio;
   mapping the portion of the cloud-deployed storage device to a portion of a logical storage device;
   determining a number of cloud-deployed storage devices to provision at maximum capacity, thus defining a number of maximum capacity cloud-deployed storage devices;
   determining a maximum IOPS metric for each maximum capacity cloud-deployed storage device based upon, at least in part, a maximum cloud-deployed storage device capacity;
   determining a number of cloud-deployed storage devices to provision at a lower capacity, thus defining a number of lower capacity cloud-deployed storage devices; and
   determining an IOPS metric of each lower capacity cloud-deployed storage device based upon, at least in part, a lower cloud-deployed storage device capacity.

7. The computer program product of claim 6, wherein the cloud-deployed storage system includes a cloud-deployed virtual storage appliance (VSA).

8. The computer program product of claim 6, wherein identifying the change in the capacity of the cloud-deployed storage system includes identifying a request to increase the capacity of the cloud-deployed storage system.

9. The computer program product of claim 6, wherein modifying the portion of the cloud-deployed storage device includes:
   determining a second capacity ratio and a second IOPS ratio for the cloud-deployed storage system; and
   determining that the second capacity ratio is greater than or equal to the second IOPS ratio.

10. The computer program product of claim 9, wherein the operations further comprise:
    determining a number of cloud-deployed storage devices to provision at a maximum IOPS metric, thus defining a number of maximum IOPS cloud-deployed storage devices;
    determining a maximum storage capacity for each maximum IOPS cloud-deployed storage device based upon, at least in part, the maximum IOPS metric;
    determining a number of cloud-deployed storage devices to provision at a lower IOPS metric, thus defining a number of lower IOPS cloud-deployed storage devices; and
    determining a storage capacity for each lower IOPS cloud-deployed storage device based upon, at least in part, the maximum IOPS metric.

11. A computing system comprising:
    a memory; and
    a processor configured: to identify a change in a capacity of a cloud-deployed storage system, to determine a first capacity ratio and a first IOPS ratio for the cloud-deployed storage system, to modify a portion of a cloud-deployed storage device based upon, at least in part, one or more of the first capacity ratio and the first IOPS ratio, wherein modifying the portion of the cloud-deployed storage device includes determining that the first capacity ratio is less than the first IOPS ratio, to map the portion of the cloud-deployed storage device to a portion of a logical storage device, to determine a number of cloud-deployed storage devices to provision at maximum capacity, thus defining a number of maximum capacity cloud-deployed storage devices, to determine a maximum IOPS metric for each maximum capacity cloud-deployed storage device based upon, at least in part, a maximum cloud-deployed storage device capacity, to determine a number of cloud-deployed storage devices to provision at a lower capacity, thus defining a number of lower capacity cloud-deployed storage devices, and to determine an IOPS metric of each lower capacity cloud-deployed storage device based upon, at least in part, a lower cloud-deployed storage device capacity.

12. The computing system of claim 11, wherein the cloud-deployed storage system includes a cloud-deployed virtual storage appliance (VSA).

13. The computing system of claim 11, wherein identifying the change in the capacity of the cloud-deployed storage system includes identifying a request to increase the capacity of the cloud-deployed storage system.

14. The computing system of claim 11, wherein modifying the portion of the cloud-deployed storage device includes:
   determining a second capacity ratio and a second IOPS ratio for the cloud-deployed storage system; and
   determining that the second capacity ratio is greater than or equal to the second IOPS ratio.

* * * * *